(12) United States Patent
Okino (10) Patent No.: US 11,277,026 B2
(45) Date of Patent: Mar. 15, 2022

(54) POWER MANAGEMENT SERVER, POWER MANAGEMENT METHOD, AND POWER MANAGEMENT SYSTEM

(71) Applicant: KYOCERA Corporation, Kyoto (JP)

(72) Inventor: Kenta Okino, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 176 days.

(21) Appl. No.: 16/327,498

(22) PCT Filed: Aug. 24, 2017

(86) PCT No.: PCT/JP2017/030378
§ 371 (c)(1),
(2) Date: Feb. 22, 2019

(87) PCT Pub. No.: WO2018/038219
PCT Pub. Date: Mar. 1, 2018

(65) Prior Publication Data
US 2019/0181681 A1    Jun. 13, 2019

(30) Foreign Application Priority Data

Aug. 24, 2016   (JP) .............................. JP2016-163616

(51) Int. Cl.
*H02J 13/00* (2006.01)
*G05B 15/02* (2006.01)
(Continued)

(52) U.S. Cl.
CPC ........ *H02J 13/00006* (2020.01); *G05B 15/02* (2013.01); *H02J 3/00* (2013.01);
(Continued)

(58) Field of Classification Search
None
See application file for complete search history.

(56) References Cited

U.S. PATENT DOCUMENTS

2014/0121849 A1* 5/2014 Ansari .................... H02J 3/383
                                                                    700/295
2015/0244173 A1* 8/2015 Nomura ................ H02J 7/0068
                                                                     307/32
(Continued)

FOREIGN PATENT DOCUMENTS

EP         2736144 A1    5/2014
EP         3032682 A1    6/2016
(Continued)

*Primary Examiner* — Kenneth M Lo
*Assistant Examiner* — Istiaque Ahmed
(74) *Attorney, Agent, or Firm* — Hauptman Ham, LLP (57) ABSTRACT

A power management apparatus includes a receiver configured to receive measurement information obtained by measuring a power of a facility connected to a power grid; and a transmitter configured to transmit a power control message. The transmitter transmits the power control message based on an output power amount of a distributed power supply provided in the facility, in addition to the measurement information. The measurement information is information indicating a total power flow amount from the power grid to the facility or a total reverse power flow amount from the facility to the power grid. The distributed power supply is a power supply that allows a reverse power flow from the facility to the power grid.

6 Claims, 5 Drawing Sheets

(51) Int. Cl.
*H02J 3/00* (2006.01)
*H02J 3/46* (2006.01)
*H02J 3/38* (2006.01)

(52) U.S. Cl.
CPC .................................. *H02J 3/38* (2013.01); *H02J 3/46* (2013.01); *H02J 13/00* (2013.01); *Y02E 40/70* (2013.01); *Y04S 10/123* (2013.01)

(56) References Cited

U.S. PATENT DOCUMENTS

2015/0276253 A1* 10/2015 Montalvo ............... H04L 12/12
    700/276
2018/0278091 A1* 9/2018 Fukasawa .............. G08C 15/00

FOREIGN PATENT DOCUMENTS

| | | |
|---|---|---|
| JP | 2013-169104 A | 8/2013 |
| JP | 2014-128107 A | 7/2014 |
| JP | 2015-6081 A | 1/2015 |
| JP | 2015-211556 A | 11/2015 |

\* cited by examiner

POWER MANAGEMENT SERVER, POWER MANAGEMENT METHOD, AND POWER MANAGEMENT SYSTEM

RELATED APPLICATIONS

The present application is a National Phase of PCT/JP2017/030378, filed Aug. 24, 2017, and claims priority based on Japanese Patent Application No. 2016-163616, filed Aug. 24, 2016.

TECHNICAL FIELD

The present invention relates to a power management server, a power management method, and a power management system.

BACKGROUND ART

In recent years, power suppression messages such as a power flow message requesting suppression of a power flow amount from a power grid to a facility and a reverse power flow message requesting suppression of a reverse power flow amount from the facility to the power grid have been known (see, for example, Patent Literatures 1 and 2).

Under the background described above, a smart meter has been known as a power meter that measures a total power flow amount from the power grid to the facility or a total reverse power flow amount from the facility to the power grid. It is conceivable to predict a power demand-supply balance based on the total power flow amount or the total reverse power flow amount measured by such a smart meter.

However, when the facility is provided with a distributed power supply that allows a reverse power flow from the facility to the power grid, there is a possibility that the power flow amount or the reverse power flow amount cannot be appropriately controlled by only the information measured by the smart meter.

CITATION LIST

Patent Literature

Patent Literature 1: Japanese Application Publication No. 2013-169104
Patent Literature 2: Japanese Application Publication No. 2014-128107

SUMMARY OF INVENTION

A power management server according to a first aspect comprises: a receiver configured to receive measurement information obtained by measuring a power of a facility connected to a power grid; and a transmitter configured to transmit a power control message. The transmitter transmits the power control message based on an output power amount of a distributed power supply in addition to the measurement information. The measurement information is information indicating a total power flow amount from the power grid to the facility or a total reverse power flow amount from the facility to the power grid. The distributed power supply is a power supply that allows a reverse power flow from the facility to the power grid.

A power management method according to a second aspect comprises: a step A of receiving measurement information obtained by measuring a power of a facility connected to a power grid; and a step B of transmitting a power control message. The step B includes a step of transmitting the power control message based on an output power amount of a distributed power supply in addition to the measurement information. The measurement information is information indicating a total power flow amount from the power grid to the facility or a total reverse power flow amount from the facility to the power grid. The distributed power supply is a power supply that allows a reverse power flow from the facility to the power grid.

A power management system according to a third aspect comprises: a receiver configured to receive measurement information obtained by measuring a power of a facility connected to a power grid; and a transmitter configured to transmit a power control message. The transmitter transmits the power control message based on an output power amount of a distributed power supply in addition to the measurement information. The measurement information is information indicating a total power flow amount from the power grid to the facility or a total reverse power flow amount from the facility to the power grid. The distributed power supply is a power supply that allows a reverse power flow from the facility to the power grid.

DESCRIPTION OF EMBODIMENTS

Hereinafter, embodiments will be described with reference to the drawings. In the following description of the drawings, the same or similar parts are denoted by the same or similar reference numerals.

However, it should be noted that the drawings are schematic and ratios and the like of the respective dimensions may be different from actual ratios and the like of the respective dimensions. Therefore, concrete dimensions and the like should be decided with reference to the following description. In addition, parts having different dimensional relationships or ratios are included between the drawings.

Figure 1:
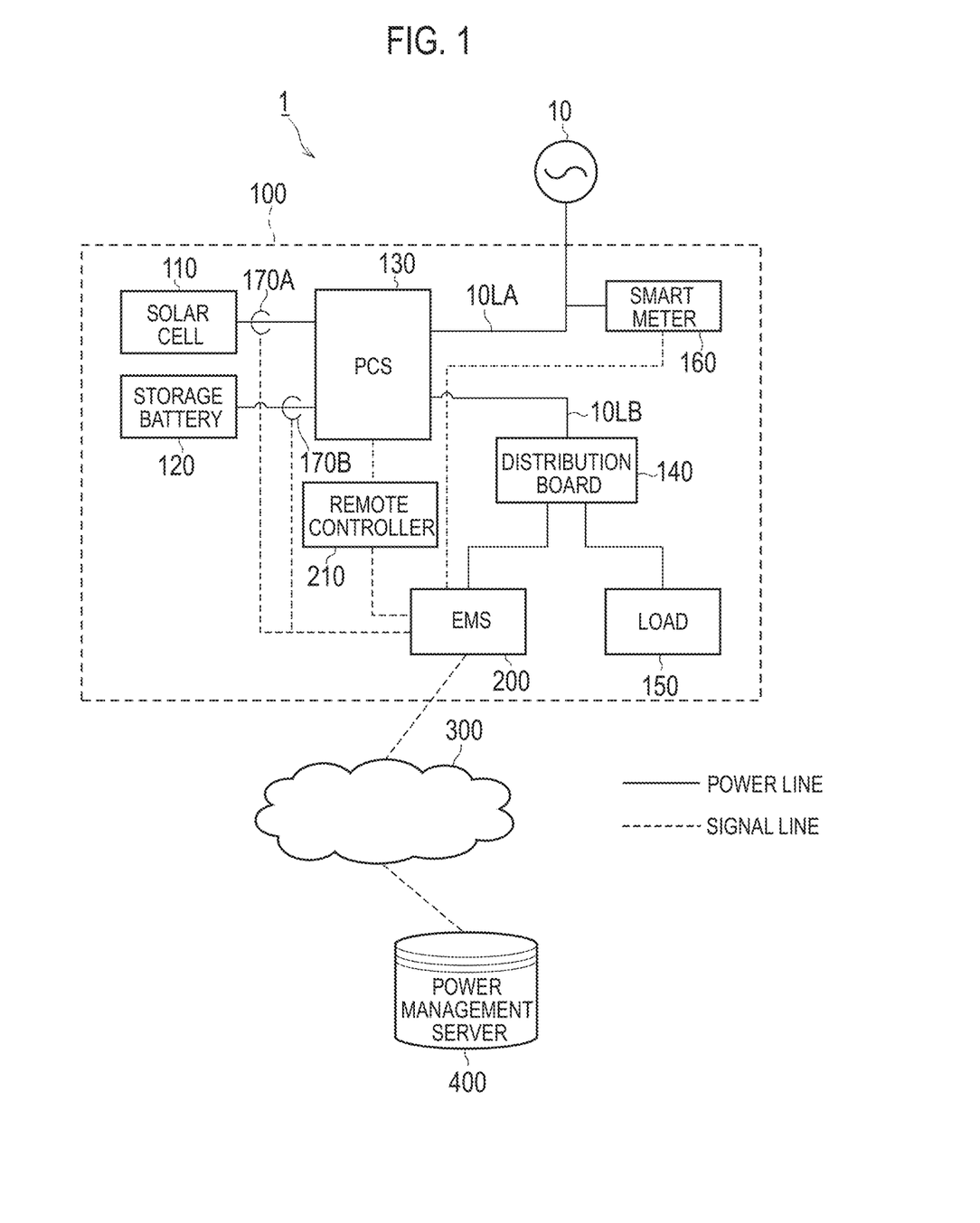
FIG. 1 is a view showing a power management system 1 according to an embodiment.

Embodiment (Power Management System)
Hereinafter, a power management system according to an embodiment will be described. As shown in FIG. 1, a power management system 1 includes a facility 100 and a power management server 400. The facility 100 includes an EMS 200, and the EMS 200 communicates with the power management server 400 through a network 300.

The facility 100 includes a solar cell 110, a storage battery 120, a PCS 130, a distribution board 140, a load 150, a power meter (hereinafter, referred to as a smart meter) 160, and a sensor 170. Further, the facility 100 includes the EMS 200 and a remote controller 210. Although an example in which the power management system 1 includes the solar cell 110, the storage battery 120, the PCS 130, the distribution board 140, and the load 150 has been shown in FIG. 1, the power management system 1 is not limited to thereto, and any one of these components may be omitted.

The solar cell 110 is a photoelectric conversion apparatus that generates a power in response to light reception. The solar cell 110 outputs the generated direct current (DC) power. A power generation amount of the solar cell 110 is changed depending on an amount of solar radiation irradiated to the solar cell 110. The solar cell 110 is an example of a distributed power supply that allows a reverse power flow from the facility 100 to a power grid 10.

The storage battery 120 is an apparatus that stores the power. The storage battery 120 outputs the stored DC power. In the embodiment, the storage battery 120 may be a distributed power supply that allows a reverse power flow from the facility 100 to the power grid 10 or may be a distributed power supply that does not allow a reverse power flow from the facility 100 to the power grid 10. In addition, the storage battery 120 may appropriately switch between a state in which the reverse power flow is allowed and a state in which the reverse power flow is not allowed according to an instruction from the power management server 400.

The PCS 130 is an example of a power conditioning system (PCS) that converts a DC power into an alternating current (AC) power. In the embodiment, the PCS 130 is connected to trunk power lines 10L (here, a trunk power line 10LA and a trunk power line 10LB) connected to the power grid 10, and is also connected to both of the solar cell 110 and the storage battery 120. The trunk power line 10LA is a power line that connects the power grid 10 and the PCS 130 to each other, and the trunk power line 10LB is a power line that connects the PCS 130 and the distribution board 140 to each other.

Here, the PCS 130 converts the DC power input from the solar cell 110 into an AC power, and converts the DC power input from the storage battery 120 into an AC power. Further, the PCS 130 converts an AC power supplied from the power grid 10 into a DC power.

The distribution board 140 is connected to the trunk power line 10L (here, the trunk power line 10LB). The distribution board 140 branches the trunk power line 10LB into a plurality of power lines, and distributes a power to equipments (here, the load 150 and the EMS 200) connected to the plurality of power lines.

The load 150 is an apparatus that consumes the power supplied through the power line. For example, the load 150 includes apparatuses such as a refrigerator, a lighting apparatus, an air conditioner, and a television. The load 150 may be a single apparatus or may include a plurality of apparatuses.

The smart meter 160 measures a power flow amount (total power flow amount) from the power grid 10. The smart meter 160 may also measure a reverse power flow amount (total reverse power flow amount) to the power grid 10. The total power flow amount and the total reverse power flow amount may be a power flow amount and a reverse power flow amount for a predetermined period, respectively. The predetermined period can be set to, for example, 30 days, 1 month, 1 year, or a meter reading interval.

The sensor 170 measures a power amount output from the distributed power supply. The sensor 170 is, for example, a current transformer (CT) sensor.

In FIG. 1, a sensor 170A that measures a power amount output from the solar cell 110 is provided as at least the sensor 170. A sensor 170B that measures a power amount supplied to the storage battery 120 and a power amount output from the storage battery 120 may also be provided as the sensor 170.

The EMS 200 is an apparatus (energy management system (EMS)) that manages a power of the facility 100. The EMS 200 may be configured integrally with the distribution board 140 or the PCS 130 or may be a cloud server through the network 300.

The remote controller 210 is annexed to the PCS 130, and notifies the PCS 130 of various messages for operating the PCS 130. For example, the remote controller 210 may notify the PCS 130 of a message received from the EMS 200.

The network 300 is a communication network that connects the EMS 200 and the power management server 400 to each other. The network 300 may be the Internet. The network 300 may include a mobile communication network.

The power management server 400 is a server managed by a company such as a power generation company, a power transmission/distribution company, or a power retail company. The power management server transmits a power control message including at least one of a control message for controlling an operation of the distributed power supply installed in the facility 100, a power flow control message for requesting control of an increase, a decrease, or maintenance of the power flow amount from the power grid 10 to the facility 100, and a reverse power flow control message for requesting control of an increase, a decrease, or maintenance of the reverse power flow amount from the facility 100 to the power grid 10. The reverse power flow control message may be considered as an output control message for instructing output control of the distributed power supply. The power flow control message may be a power flow suppression message (demand response (DR)) for requesting suppression of the power flow amount. The control message is a command for controlling the operation of the distributed power supply of the facility 100 as a virtual power plant, for example, a command such as charging, discharging, power generation, a reverse power flow, or an automatic operation.

(Power Management Server)

Figure 2:
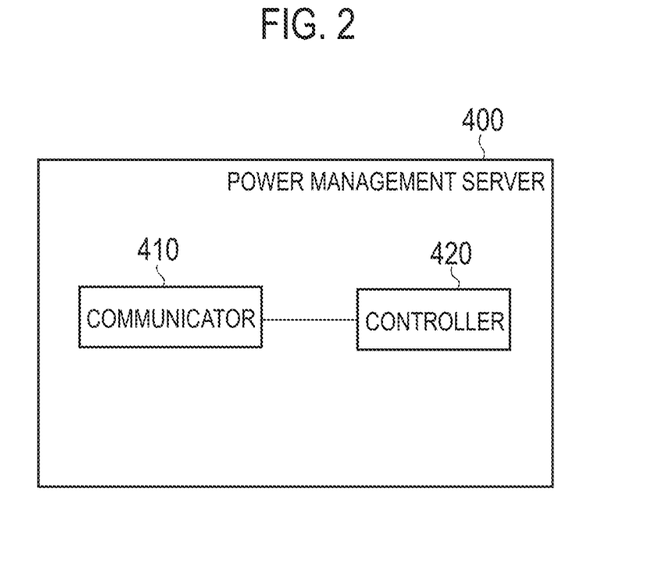
FIG. 2 is a view showing a power management server according to an embodiment.

Hereinafter, a power management server according to an embodiment will be described. As shown in FIG. 2, a power management server 400 includes a communicator 410 and a controller 420.

The communicator 410 receives measurement information measured by the smart meter 160. The communicator 410 receives information indicating an output power amount of the distributed power supply provided in the facility 100. The output power amount is, for example, the power amount measured by the sensor 170A. However, the embodiment is not limited thereto. The output power amount may also be the power amount measured by the sensor 170A and the power amount measured by the sensor 170B. Further, the output power amount may also be an output power amount of the PCS 130. The communicator 410 transmits a power control message including at least one of a power supply control message, a power flow control message, and a reverse power flow control message.

The controller 420 includes a memory and a central processing unit (CPU), and controls the power management server 400. The controller 420 establishes a control plan using the power control message based on the measurement information and the output power amount. The control plan includes a transmission partner of the power control message and a transmission content of the power control message. The transmission content includes a content indicating how much to increase or decrease the power flow amount or the reverse power flow amount. That is, the controller 420 establishes a control plan using the power control message based on the output power amount of the distributed power supply, in addition to the total power flow amount or the total reverse power flow amount.

(1) Case of Transmitting Power Flow Control Message

First, when the measurement information measured by the smart meter 160 is the total reverse power flow amount, the controller 420 establishes a control plan that preferentially transmits the power flow control message to the facility 100 in which a value obtained by subtracting the total reverse power flow amount from the output power amount is larger than such value in another facility 100.

Second, when the measurement information measured by the smart meter 160 is the total power flow amount, the controller 420 establishes a control plan that preferentially transmits the power flow control message to the facility 100 in which a value obtained by adding the total power flow amount to the output power amount is larger than such value in another facility 100.

Here, the value obtained by subtracting the total reverse power flow amount from the output power amount and the value obtained by adding the total power flow to the output power amount can be simply considered as a power consumption amount in the facility 100. That is, the controller 420 establishes a control plan that preferentially transmits the power flow control message to the facility 100 in which a power consumption amount is large. As described above, by considering that there is a large room to decrease the power consumption amount in the facility 100 in which the power consumption amount is large, it is possible to increase a possibility that the control of the power flow amount will be realized by the power flow control message with a simple configuration.

(2) Case of Transmitting Reverse Power Flow Control Message

First, when the measurement information measured by the smart meter 160 is the total reverse power flow amount, the controller 420 establishes a control plan that preferentially transmits the reverse power flow control message to the facility 100 in which a value obtained by subtracting the total reverse power flow amount from the output power amount is smaller than such value in another facility 100.

Second, when the measurement information measured by the smart meter 160 is the total power flow amount, the controller 420 establishes a control plan that preferentially transmits the reverse power flow control message to the facility 100 in which a value obtained by adding the total power flow amount to the output power amount is smaller than such value in another facility 100.

Here, the value obtained by subtracting the total reverse power flow amount from the output power amount and the value obtained by adding the total power flow to the output power amount can be simply considered as a power consumption amount in the facility 100. That is, the controller 420 establishes a control plan that preferentially transmits the reverse power flow control message to the facility 100 in which a power consumption amount is small. As described above, by considering that it is likely to increase the power consumption amount in the facility 100 in which the power consumption amount is small, it is possible to increase a possibility that the control of the reverse power flow amount will be realized by the reverse power flow control message with a simple configuration.

Further, when the measurement information measured by the smart meter 160 is the total reverse power flow amount, the controller 420 may also establish a control plan that preferentially transmits the power flow control message to the facility 100 in which the output power amount is large. Since it is considered that there is a high possibility that output control will be performed on the facility 100 having the distributed power supply in which the output power amount is large, it is possible to increase a possibility that the control of the reverse power flow amount will be realized by the reverse power flow control message.

(Power Management Method)

Figure 3:
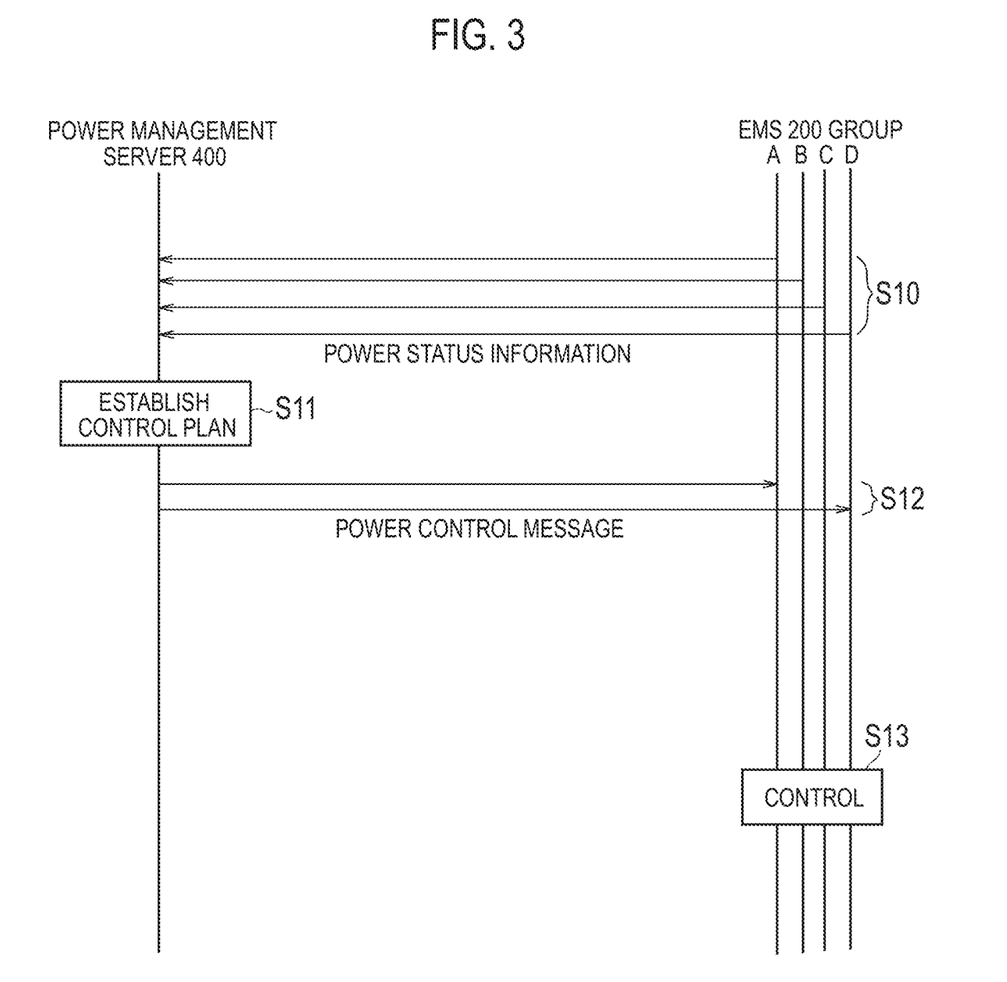
FIG. 3 is a view showing a power management method according to an embodiment.

Hereinafter, a power management method according to an embodiment will be described. Here, a case where an EMS 200A to an EMS 200D are provided in facilities A to D, respectively, will be described.

As shown in FIG. 3, in step S10, an EMS 200 group transmits power status information to the power management server 400. The power status information includes the measurement information measured by the smart meter 160 and the information indicating the output power amount of the distributed power supply.

In step S11, the power management server 400 determines the control of the power flow amount or the reverse power flow amount, and also establishes a control plan using the power control message based on the measurement information and the output power amount. A method of establishing the control plan is as described above.

In step S12, the power management server 400 transmits the power control message based on the control plan. Here, a case where the power control message is transmitted to the EMS 200A and the EMS 200D is exemplified.

In step S13, the EMS 200A and the EMS 200D control the power flow amount or the reverse power flow amount depending on the power control message.

Figure 4:
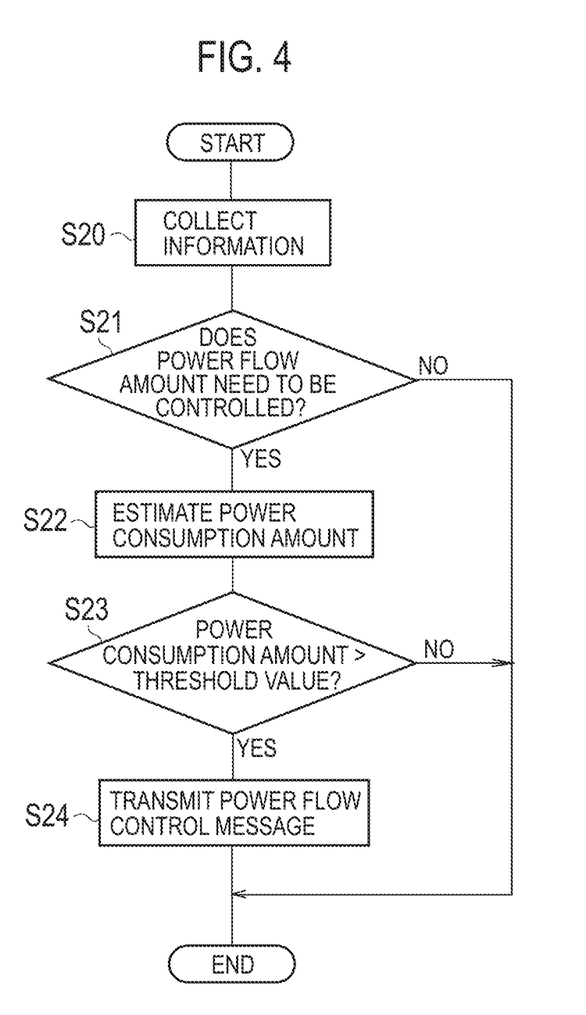
FIG. 4 is a view showing a power management method according to an embodiment.

Next, a flowchart of the power management server 400 will be described. Here, a case where the power flow amount needs to be controlled is exemplified.

As shown in FIG. 4, in step S20, the power management server 400 collects the measurement information measured by the smart meter 160 and the information indicating the output power amount of the distributed power supply.

In step S21, the power management server 400 determines whether or not the power flow amount needs to be controlled based on a power demand-supply balance in the power grid 10. When the power flow amount needs to be controlled, a process of step S22 is performed. When the power flow amount does not need to be controlled, a series of processes end.

In step S22, the power management server 400 estimates the power consumption amount of the facility 100 based on the measurement information measured by the smart meter 160 and the output power amount of the distributed power supply.

In step S23, the power management server 400 determines whether or not the power consumption amount is larger than a threshold value. When the power consumption amount is larger than the threshold value, a process of step S24 is performed. When the power consumption amount is not larger than the threshold value, a series of processes are ended.

In step S24, the power management server 400 determines to transmit the power flow control message to the EMS 200 of the facility 100.

Here, processes of step S20 to step S24 are performed on all of the facilities 100 managed by the power management server 400. As a result, the power flow control message is transmitted to the facility 100 in which a power consumption amount is large.

(Action and Effect)

In the embodiment, the power management server 400 establishes a control plan using the power control message based on the measurement information (the total power flow amount or the total reverse power flow amount) measured by the smart meter 160 and the output power amount. Therefore, compared to a case of establishing a control plan using only the measurement information measured by the smart meter 160, a possibility that control of the power flow amount or the reverse power flow amount will be performed can be increased. On the other hand, since a detailed consumed power or the like of the load 150 does not need to be acquired, it is possible to improve accuracy of the control plan with a relatively simple configuration.

Modified Example 1

Hereinafter, Modified Example 1 of the embodiment will be described. Portions different from those of the embodiment will mainly be described below.

Specifically, in Modified Example 1, a case where there is a need to perform the control the reverse power flow amount (the output power amount of the distributed power supply) as well as the control of the power flow amount in a section managed by the power management server 400 is assumed. In such a case, the power management server 400 transmits the power flow control message to the facility 100 in which the reverse power flow amount is not controlled at the time of determination.

Figure 5:
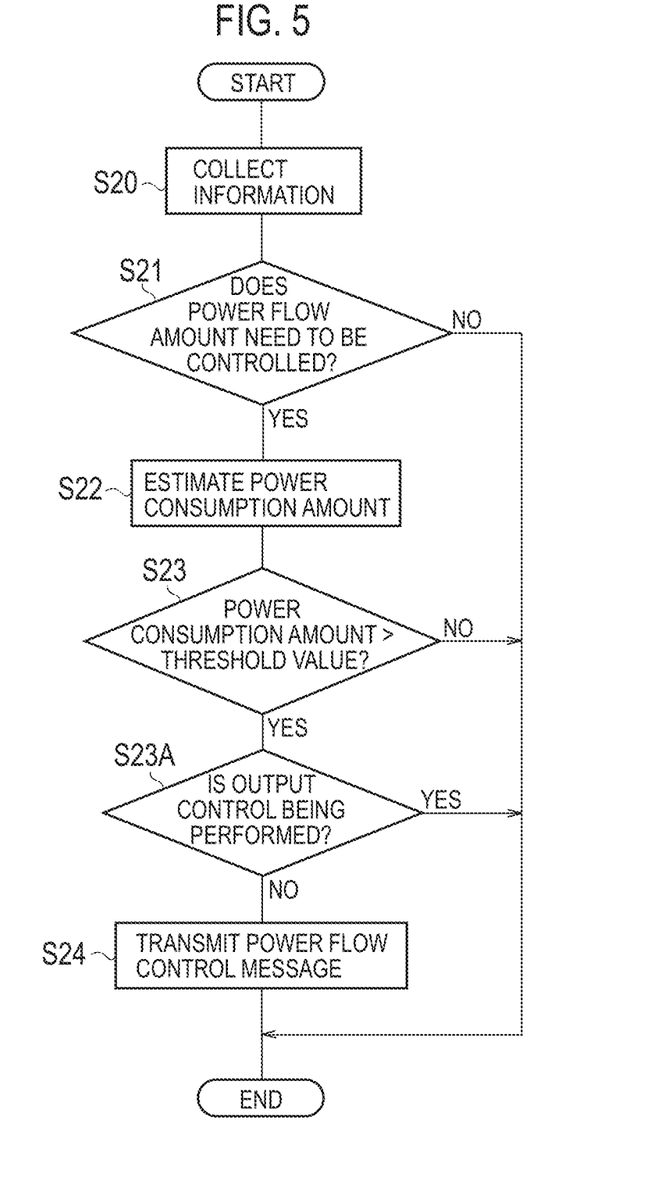
FIG. 5 is a view showing a power management method according to a modified example 1.

Specifically, as shown in FIG. 5, a process of step S23A is added after step S23 in the flowchart shown in FIG. 4.

In step S23A, the power management server 400 determines whether or not the output control is being performed in the facility 100. When the output control is not being performed, a process of step S24 is performed. When the output control is being performed, a series of processes end.

(Action and Effect)

In Modified Example 1, the power management server 400 transmits the power flow control message to the facility 100 in which the reverse power flow amount is not controlled. Therefore, a situation in which a voltage of the power grid 10 is raised by the transmission of the power flow control message is controlled.

Modified Example 2

Hereinafter, Modified Example 2 of the embodiment will be described. Portions different from those of the embodiment will mainly be described below.

In Modified Example 2, a case where an entity providing a power to the facility 100 is different from an entity purchasing a power from the facility 100 is exemplified. The entity providing the power to the facility 100 may be considered as an entity managing the power flow amount to the facility 100. The entity purchasing the power from the facility 100 may be considered as an entity managing the reverse power flow amount from the facility 100. Under such a premise, a case where the power management server belongs to the entity purchasing the power from the facility 100 is considered. The entity providing the power to the facility 100 may be a company such as a power generation company, a power transmission/distribution company, or a power retail company. The entity purchasing the power from the facility 100 may be a company such as a power generation company, a power transmission/distribution company, or a power retail company.

The power management server 400 transmits the power flow control message to the facility 100 having the distributed power supply in which the output power amount is equal to or larger than a predetermined threshold value. In other words, the power management server 400 transmits the power flow control message to the facility 100 in which an output power amount of the distributed power supply that allows the reverse power flow is large.

The predetermined threshold value described above is not particularly limited, but since the entity providing the power to the facility 100 is different from the entity purchasing the power from the facility 100, it is preferable that the predetermined threshold value is determined so that the facility 100 may not purchase the power.

Alternatively, the power management server 400 estimates a power consumption amount consumed in the facility 100 and a power reduction amount that can be reduced in the facility, based on the measurement information measured by the smart meter 160 and the output power amount of the distributed power supply. Specifically, the power consumption amount corresponds to a value obtained by subtracting the total reverse power flow amount from the output power amount. Meanwhile, the power reduction amount is a power amount that can be reduced by switching of an operation mode of the load 150 provided in the facility 100. The power amount that can be reduced may be determined as a constant ratio of the power consumption amount. The predetermined ratio may be determined in advance by a manager or the like of the facility 100 or may be determined by a type of load 150 provided in the facility 100.

In such a case, the predetermined threshold value may be a value obtained by subtracting the power reduction amount from the power consumption amount. That is, under the premise that it is possible to reduce the power consumption amount by the power reduction amount by the power flow control message, the power flow control message is transmitted to the facility 100 in which an output power amount is larger than a power consumption amount after being reduced by the power flow control message.

However, Modified Example 2 is not limited thereto. The predetermined threshold value described above may be the total reverse power flow amount. That is, the power flow control message may be transmitted to the facility 100 in which the output power amount is larger than a power consumption amount before being reduced by the power flow control message. The present invention is not limited to the case where the entity providing the power to the facility 100 and the entity purchasing the power from the facility 100 are different from each other, and the entity providing the power to the facility 100 and the entity purchasing the power from the facility 100 may be the same as each other.

OTHER EMBODIMENTS

Although the present invention has been described with reference to the abovementioned embodiment, it should not be understood that the description and the drawings constituting a part of this disclosure limit the present invention. From this disclosure, various alternative embodiments, examples, and operational technologies will be apparent to those skilled in the art.

In the embodiment, the solar cell 110 has been exemplified as the distributed power supply that allows the reverse power flow. However, the embodiment is not limited thereto. The distributed power supply that allows the reverse power flow may be the storage battery 120. Further, the distributed power supply that allows the reverse power flow may be a fuel cell.

In the embodiment, the power management server 400 receives the information indicating the output power amount of the distributed power supply from the EMS 200. However, the embodiment is not limited thereto. In a case where the distributed power supply is the solar cell 110, an output power amount of the solar cell 110 may be estimated from a rating and an amount of solar radiation of the solar cell 110. In a case where the distributed power supply is the fuel cell, an output power amount of the fuel cell may be estimated by an amount of gas supplied to the fuel cell. In these cases, the power management server 400 may not receive the information indicating the output power amount of the distributed power supply from the EMS 200.

Although not specifically mentioned in the embodiment, the power management server 400 may transmit the power flow control message to the facility 100 having a distributed power supply in which the output power amount is small. This is because the control of the power flow amount is expected due to an increase in the output power amount of the distributed power supply. Such a configuration is useful for a distributed power supply (for example, a fuel cell) capable of increasing the output power amount without being influenced by a natural condition.

Although not specifically mentioned in the embodiment, the power management server 400 may transmit the reverse power flow control message to the facility 100 having a distributed power supply in which the output power amount is large. This is because the control of the reverse power flow amount is expected due to a decrease in the output power amount of the distributed power supply.

In the embodiment, the PCS 130 is a hybrid-type PCS connected to both of the solar cell 110 and the storage battery 120. However, the embodiment is not limited thereto. Two PCSs connected to the solar cell 110 and the storage battery 120, respectively, may be provided.

In the embodiment, the control of the power flow amount or the reverse power flow amount has mainly been described. That is, the power flow control message and the reverse power flow control message have been exemplified as the power control messages. However, the embodiment is not limited thereto. Specifically, the embodiment can also be applied to a system (virtual power plant (VPP)) that uses the distributed power supply provided in the facility 100. In such a case, the power control message may also be called a power supply control message requesting the control of the distributed power supply installed in the facility 100.

The entire contents of Japanese Patent Application No. 2016-163616 (filed on Aug. 24, 2016) are incorporated herein by reference.

INDUSTRIAL APPLICABILITY

According to one aspect, it is possible to provide the power management server, the power management method, and the power management system that can appropriately control the power flow amount or the reverse power flow amount.

The invention claimed is:

1. A power management server, comprising:
a receiver configured to receive measurement information obtained by measuring, at a smart meter, a power of at least one facility connected to a power grid;
a transmitter configured to transmit a power control message based on an output power amount of a distributed power supply provided in the at least one facility, and based on the measurement information; and
a processor, wherein
the output power amount of the distributed power supply is measured by a sensor different from the smart meter, the measurement information indicates a total power flow amount from the power grid to the facility, or indicates a total reverse power flow amount from the facility to the power grid,
the distributed power supply allows a reverse power flow from the facility to the power grid,
the at least one facility comprises a plurality of facilities,
the power control message includes a power flow control message from the power grid to one of the plurality of facilities,
the processor is configured to calculate
a first value by subtracting the total reverse power flow amount from the output power amount, and
a second value by adding the total power flow amount to the output power amount, and
the transmitter is configured to transmit the power flow control message to a facility among the plurality of facilities in which the first value larger than such value in another facility among the plurality of facilities or the second value is larger than such value in another facility among the plurality of facilities.

2. The power management server according to claim 1, wherein
the transmitter is configured to transmit the power flow control message to the facility when a reverse power flow amount from the facility to the power grid is not controlled.

3. The power management server according to claim 1, wherein
an entity providing a power to the facility is different from an entity purchasing a power from the facility,
the power management server is controlled by the entity purchasing the power from the facility, and
the transmitter is configured to transmit the power flow control message to the facility providing the distributed power supply when the output power amount is equal to or greater than a predetermined threshold value.

4. A power management server, comprising:
a receiver configured to receive measurement information obtained by measuring a power of at least one facility connected to a power grid;
a transmitter configured to transmit a power control message based on an output power amount of a distributed power supply provided in the at least one facility, and based on the measurement information; and
a controller, wherein
the measurement information indicates a total power flow amount from the power grid to the facility or indicates a total reverse power flow amount from the facility to the power grid,
the distributed power supply allows a reverse power flow from the facility to the power grid,
the power control message includes a power flow control message from the power grid to the facility,
an entity providing a power to the facility is different from an entity purchasing a power from the facility,
the power management server is controlled by the entity purchasing the power from the facility,
the transmitter is configured to transmit the power flow control message to the facility providing the distributed power supply when the output power amount is equal to or greater than a predetermined threshold value,
the controller is configured to estimate, based on the measurement information and the output power amount, a power consumption amount consumed in the facility and a power reduction amount capable of being reduced in the facility, and the predetermined threshold value is a value obtained by subtracting the power reduction amount from the power consumption amount.

5. A power management method, comprising:

receiving measurement information obtained by measuring, at a smart meter, a power of at least one facility connected to a power grid; and transmitting a power control message based on an output power amount of a distributed power supply, and based on the measurement information, wherein the output power amount of the distributed power supply is measured by a sensor different from the smart meter, the measurement information indicates a total power flow amount from the power grid to the facility, or indicates a total reverse power flow amount from the facility to the power grid, the distributed power supply allows a reverse power flow from the facility to the power grid, the at least one facility comprises a plurality of facilities, the power control message includes a power flow control message from the power grid to one of the plurality of facilities, and the method further comprises calculating a first value by subtracting the total reverse power flow amount from the output power amount;

calculating a second value by adding the total power flow amount to the output power amount; and transmitting the power flow control message to a facility among the plurality of facilities in which the first value larger than such value in another facility among the plurality of facilities or the second value is larger than such value in another facility among the plurality of facilities.

6. A power management system, comprising:

a receiver configured to receive measurement information obtained by measuring, at a smart meter, a power of at least one facility connected to a power grid;

a transmitter configured to transmit a power control message based on an output power amount of a distributed power supply, and based on the measurement information; and a processor, wherein the output power amount of the distributed power supply is measured by a sensor different from the smart meter, the measurement information indicates a total power flow amount from the power grid to the facility, or indicates or a total reverse power flow amount from the facility to the power grid, the distributed power supply allows a reverse power flow from the facility to the power grid, the at least one facility comprises a plurality of facilities, the power control message includes a power flow control message from the power grid to one of the plurality of facilities, and the processor is configured to calculate a first value by subtracting the total reverse power flow amount from the output power amount, and a second value by adding the total power flow amount to the output power amount, and the transmitter is configured to transmit the power flow control message to a facility among the plurality of facilities in which the first value larger than such value in another facility among the plurality of facilities or the second value is larger than such value in another facility among the plurality of facilities.

* * * * *